(12) United States Patent
Lopp

(10) Patent No.: US 6,290,741 B1
(45) Date of Patent: Sep. 18, 2001

(54) AUXILIARY DEVICE FOR FILTER EXCHANGE IN CLEAN ROOM

(75) Inventor: Craig Lopp, Round Rock, TX (US)

(73) Assignee: Samsung Austin Semiconductor, L.P., Austin, TX (US)

(*) Notice: Subject to any disclaimer, the term of this patent is extended or adjusted under 35 U.S.C. 154(b) by 0 days.

(21) Appl. No.: 09/550,011

(22) Filed: Apr. 14, 2000

Related U.S. Application Data

(60) Provisional application No. 60/131,905, filed on Apr. 30, 1999.

(51) Int. Cl.[7] ............................. B01D 35/14; B01D 29/52
(52) U.S. Cl. .......................... 55/385.2; 55/422; 55/484; 55/502; 454/187; 96/421
(58) Field of Search .................................. 55/385.2, 422, 55/484, 502, 284, 286; 454/187; 49/477.1; 96/421

(56) References Cited

U.S. PATENT DOCUMENTS

| | | | |
|---|---|---|---|
| 3,840,733 | * 10/1974 | Stein | 240/11.2 R |
| 4,040,210 | * 8/1977 | Land | 49/477.1 |
| 5,993,519 | * 11/1999 | Lim et al. | 95/286 |

OTHER PUBLICATIONS

Presray Corporation; Pneuma–Seal Corners and Minimum Diameters; Presray Website; www.presray.com; pp. 1–2; Apr. 26, 1999.

\* cited by examiner

*Primary Examiner*—David A. Simmons
*Assistant Examiner*—Robert A. Hopkins
(74) *Attorney, Agent, or Firm*—Timothy M. Honeycutt

(57) ABSTRACT

An auxiliary device for filter exchange in an air filtering system of a clean room for allowing easy exchange of the filter used in the clean room. The auxiliary device for filter exchange may include a block plate having a width to be inserted through a filter frame extended downwardly toward the inside of a production line and equipped with a filter thereon; a support for supporting the bottom of the block plate and facing with the inside wall of the filter frame keeping a constant distance between them; and a tube having an air passage and installed to closely adhere to the filter frame along the circumference of the support for sealing. Adjustable seal inserts (such as corner-shaped inserts) may be provided for auxiliary or additional sealing effect, for example, at corners of a filter frame. A pressure indicator may also be provided for monitoring correct inflation of the tube.

43 Claims, 7 Drawing Sheets

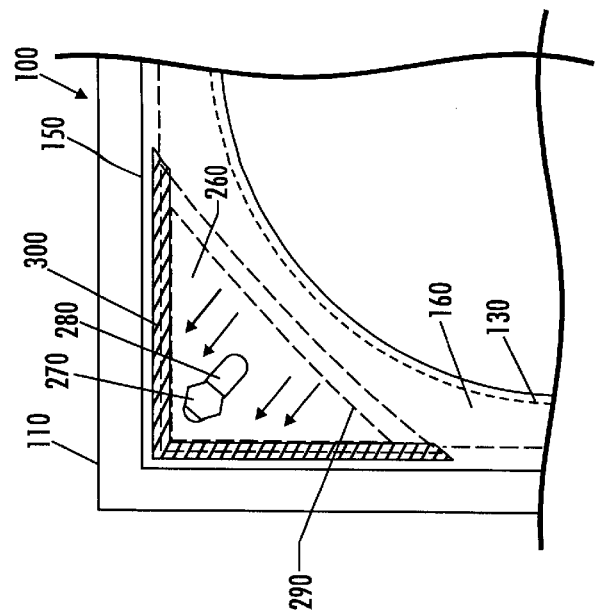
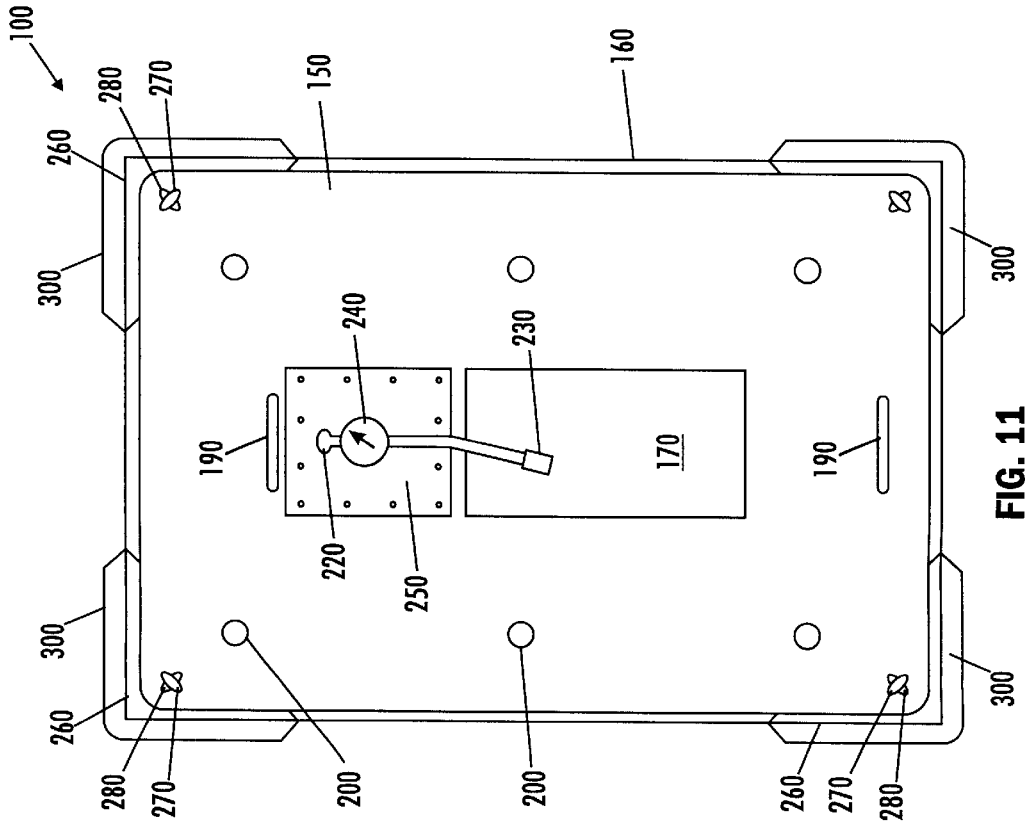

AUXILIARY DEVICE FOR FILTER EXCHANGE IN CLEAN ROOM

This application claims priority to provisional patent application Ser. No. 60/131,905 filed Apr. 30, 1999 entitled, "Auxiliary Device for Filter Exchange in Clean Room" by Craig Lopp.

BACKGROUND OF THE INVENTION

The entire text of the above-referenced disclosure is specifically incorporated by reference herein without disclaimer.

1. Field of the Invention

The disclosed device relates to an auxiliary device for filter exchange in a clean room, and more particularly to an auxiliary device for easily exchanging the filter used in a clean room.

2. Description of Related Art

There is a great demand for a high-purity production environment in the high-tech industries in order to improve the performance and the yield of the production products, wherein the high-precision, high-purity, and asepsis of the production line should be especially and strictly required.

The production environment in the industry is greatly improved benefiting from the introduction of the clean room, which is grouped into several ones like Bio Clean Room (BCR) for preventing the bio-contamination in the field, such as medical field, drug and medicine, food, genetic engineering, etc. and Industrial Clean Room (ICR) for preventing the contamination by particles in the field, such as semiconductor devices industry, precise machinery, new materials industries, etc.

Among various kinds of the above clean rooms, the semiconductor devices fabrication process requires an environment where the Down Stream Laminar Flow Type is formed inside its production line in order to remove particles having an enormous effect on the failure of the performance of semiconductor devices and the production yield.

The Down Stream Laminar Flow Type is good for quickly removing particles generated in the various equipment, materials, facilities, etc. or by operators from the production line.

The construction and the function of the clean room to form Down Stream Laminar Flow thereinside are in detail illustrated referring to FIG. 1.

As shown in FIG. 1, a grating pad 14 having a plurality of holes is installed on a pad frame 12 which is placed a certain height apart from the bottom of the clean room 10, which is divided by the upper side and lower side of the grating pad 14.

Over the grating pad 14, there is installed a production line 16 for accommodating the facility for fabricating semiconductor device (not shown in the figure for its simplicity), and below the grating pad 14, an auxiliary facility for assisting the above fabrication facility (not shown in the figure for its simplicity) and a circulation fan 18 for circulating the air inside the clean room 10.

The circulation fan 18 installed as above induces the air around the upper side and the lower side of the grating pad 14 by means of suction way and guides it to the upper side of the production line 16 through the passage 20 on the sidewall of the clean room 10.

Meanwhile, on the upper side of the production line 16 is installed a plurality of filters 22 for filtering the air which may be contaminated during its moving by being supported by a filter frame 24, and the air over the filter 22 passes through the filter 22 by the pressure state formed by the circulation fan 18 and again induced into the production line 16 in order to form the circulation line.

The air passing through the filter 22 directs downward from the upper side of the production line 16 by the circulation fan 18 and passes the holes of the grating pad 14 vertically moving downward in order to form a Down Stream Laminar Flow.

Therefore, the particles continuously generated inside the production line 16 are induced and discharged out toward the lower side of the grating pad 14 by the above Down Stream Laminar Flow in order to maintain highly pure state inside clean room 10.

In the meantime, when the filter 22 for filtering the air is damaged or contaminated losing its original function, the air which is not filtered through the damaged filter 22 and contaminated is quickly spreading and badly affects the formation of a Down Stream Laminar Flow so as to contaminate the inside the production line 16.

In order to prevent this problem, a regular inspection for the damage and contamination of the filter 22 is made, and the filter 22 to be found damaged is replaced along with a new one with emergency measures.

However, if the filter 22 is replaced while the air is continuously circulated, a large amount of contaminated air is induced into the production line 16 through an open area so as to contaminate the production line 16.

Therefore, according to the conventional method, the exchange of the damaged filter 22 is carried out in such a manner that the end side of the anti-electrostatic vinyl between the filter frame 24 and the pad frame 12 which respectively support the filter 22 to be exchanged, and the grating pad 14 placed under the filter 22 is sealed by using the adhesive member 28, and then the damaged filter 22 is replaced on the upper side of the filter frame 24.

However, as the damaged filter 22 is replaced, the air existing in the upper side of the filter frame 24 moves toward the open area by the pressure difference due to the exchange.

By pressure of the air passing through the anti-electrostatic vinyl 26, and the pressure difference inside the production line 16, the sealed end of the anti-electrostatic vinyl 26 is separated, and through the open area, the induced, non-filtered and contaminated air spreads inside the production line 16 thereby causing the contamination thereof.

Therefore, conventional exchange operation of the filter 22 required the stop of various kinds of facilities installed inside the production line 16. Further, the conventional exchange operation is carried out with the air circulation stopped, which results in a reduction of the productivity and increased time loss, due to the necessity of facility restoration.

SUMMARY OF THE INVENTION

Disclosed is an auxiliary device or jig for filter exchange, wherein a damaged filter of the production line is easily and rapidly replaced while the production facilities are on operation with the air around circulated, thereby improving the productivity and reducing the restoration time for the facility, which substantially obviates one or more of the problems due to limitations and disadvantages of the related art.

To achieve these and other advantages, and in accordance with the purpose of the disclosed device, as embodied and broadly described, there is provided an auxiliary device or jig for filter exchange used in a filtering system comprising a plurality of filters, and a plurality of filter frames extended downwardly toward the inside of the production line, wherein the auxiliary device for filter exchange has a temporary frame installed corresponding to the extended part of the filter frame in order to prevent contaminated air to pass through.

In one embodiment, an auxiliary device or jig for filter exchange may include a block plate having a width to be inserted through the filter frame extended downwardly toward the inside of a production line and equipped with a filter thereon; a support for supporting the bottom of the block plate and facing with the inside wall of the filter frame keeping a constant distance between them; and a tube having an air passage and installed to closely adhere to the filter frame along the circumference of the support for sealing.

The support includes a plurality of plates, each of them facing with each corresponding inside wall of the filter frame in its every direction, and the position in which the tube is placed has a concave-shape, and the upper side of the support is integrated with the lower circumference side of the block plate.

In addition, the support includes an upper plate facing the bottom of the block plate, a side wall extended downwardly from the peripheral side of the upper plate, and a protrusion plate extended outwardly from the bottom of the side wall. A handle is provided on a certain position of the bottom of the support.

The tube is made of elastic polymer, and a sealing member is installed in order to block the gap between the edge of the filter frame and its corresponding side of said tube.

In addition, a confirmation window which is transparent is formed in the block plate, and the confirmation window is formed such that an opening area having a certain size is formed both on the block plate and the upper plate, and the peripheral side of the opening area adheres closely to the positions of the block plate and the support which it contacts for sealing.

In addition, a ring is formed on the lower side of the filter frame, and a hanging member is formed on the lower side of the support corresponding to the ring.

A bearing means is formed on the open area of the upper plate in order to support and bear the bottom of the transparent body, and a hole having a certain size is preferably formed on the center of the transparent body and on its corresponding site of the support, and on the hole is installed a container-shaped mounting member having a hole on its bottom, and a filter installed thereinside.

In one respect, disclosed is an auxiliary device or jig for filter exchange in a clean room including: a temporary frame provided to be inserted into a filter frame extended downwardly toward the inside of a production line and equipped with a filter thereon, in which the temporary frame has an outer side wall around its periphery facing the inside wall of the filter frame, and penetrating site on its center provided with a protrusion formed on its inside wall in order to equip an auxiliary filter thereon; a tube having an air passage and installed to closely adhere to the temporary frame along the circumference of the outer side wall of the temporary frame for sealing; and an auxiliary filter inserted from the upper side of the inside wall of the temporary frame and supported by the protrusion.

In another respect, disclosed is an inflatable jig mechanism which may be used to aid in replacement of ULPA/ HEPA filters that are damaged beyond repair, without the need for any other preventive measures. Because the filter plenum area is highly pressurized, it will tend to force particles through the smallest damaged places or holes in ULPA filters and into the process bays where wafers are being manufactured. Installation and use of the disclosed inflatable jig helps ensure that airborne particles do not flow into a semiconductor production FAB from highly contaminated areas such as plenums or ducted air supply systems once a ULPA filter is removed.

In one embodiment, the jig may be lightweight aluminum having two flat plates, and holding an inflatable seal at its edges. The inflatable seal may be similar to a bicycle innertube. A small hand pump may be used to inflate the seal and cause it to press against an extended part of a filter frame (also referred to herein as a "filter frame" and including, for example, an extended portion of a "C-channel frame") where a filter is in place. In one embodiment, approximately 18 PSI of pressure is sufficient to hold such a jig in place and, in doing so, eliminate air from passing around the jig and into the process bays. The jig may be designed with expanding corner pieces, so that as the seal keeps its rounded form during inflation, the corner pieces are pushed into the corners of the C-channel, creating a complete seal around the entire jig. This feature enhances the performance of an inflatable jig, ensuring fewer particles are able to pass around the jig and into the process bays. Advantageously, once an inflatable jig is installed, a ULPA filter may be removed and replaced with a new one with confidence the process bay is not being contaminated with airborne particles.

The jig may have an optional pressure gauge to ensure that the inflatable seal is inflated to a sufficient pressure required to hold the jig in place with a strong pressure differential across it. An optional window (formed of, for example plexiglass) may be installed in the jig to allow visual contact between the person below the jig and the person above the jig who is replacing the ULPA filter. The inflatable jig may be built to work with almost any size ULPA filter. Examples include jigs dimensioned and configured for replacement of filters having a size of about 2'×4', 2'×2', 16"×16", and/or other sizes known in the art.

In another respect, disclosed is a method for replacing ULPA/HEPA filters with an inflatable jig device. Advantageously, the method of employing an inflatable jig as described is such that it may be typically installed in just a matter of minutes, and the ULPA filter may be removed and replaced with a new one without the danger of large amounts of particles entering the production bay, which would occur were the jig not in place when the ULPA filter was removed. In this way, the disclosed inflatable jig may be employed to protect manufacturing process bays from contamination during the period of time (e.g., about 10 to about 15 minutes) which is required for ULPA filter replacement. Advantageously, using the disclosed jig device, ULPA filter replacement may be performed while full production is running, eliminating the need to shut down the process bay. Without utilization of the disclosed jig device, the entire process bay and possibly all tools within the bay, would typically require complete wipedown before production could restart. As soon as the disclosed jig is installed, it creates an immediate reduction of particles entering into the process bay from a torn or damaged filter. Thus, where a damaged filter is allowing particles into the process bay, the process bay environment and wafers which are being contaminated will immediately be free from contamination and start producing higher yields upon filter replacement.

In another respect, disclosed is a filter exchange device for use in an air filtering system of a clean room having a filter frame extended downwardly toward the inside of the production line, the filter change device including: an insert frame; an adjustable sealing member surrounding the insert frame and having an outer surface adapted to be sealably received by at least a portion of an inner surface of the filter frame; and at least one seal insert sealably disposed adjacent to the outer surface of the adjustable sealing member, the seal insert configured to be sealably received by a portion of the inner surface of the filter frame. In one embodiment, the inner surface of the filter frame may have four corners; and the filter change device may include at least four seal inserts, each of the seal inserts having an outer sealing surface configured to be sealably received by one of the four corners of the inner surface of the filter frame such that the upstream side of the insert frame may be pneumatically sealed from the downstream side of the insert frame when the outer sealing surface of the insert frame may be sealably received by at least a portion of the inner surface of the filter frame. In such a case, the outer sealing surface of each of the seal inserts may have a shape complementary to the shape of a respective one of the four corners of the inner surface of the filter frame. Furthermore, the outer sealing surface of each of the seal inserts may be adjustable between a sealing position in sealing contact with one of the four corners of the inner surface of the filter frame, and an insertion position in non-sealing contact with one of the four corners of the inner surface of the filter frame. The device may further include an optional pressure indicator. The insert frame may have an upstream side and a downstream side, the upstream side of the insert frame having dimensions complementary to the inner surface of the filter frame to allow insertion of the insert frame into the downwardly extending filter frame; and the device may further include at least two optional handles positioned on the downstream side of the insert frame to assist in insertion of the upstream side of the insert frame into the filter frame. The optional pressure indicator may be disposed on the downstream side of the insert frame. Other optional features that may be advantageously employed are bottom and/or top substantially flat plates coupled to the insert frame, the flat surface of which may form a surface for blocking air flow across the insert frame. When both top and bottom plates are employed, they may sandwich the insert frame. Openings in the insert frame and/or top and bottom plates may be provided for placement of an optional viewing window to allow visual inspection through the body of the filter exchange device.

In another respect, disclosed is an auxiliary device for filter exchange in a clean room including: a block plate having a width to be inserted through a filter frame extended downwardly toward the inside of a production line and equipped with a filter thereon; a support for supporting the bottom of the block plate and facing with the inside wall of the filter frame keeping a constant distance between them; a tube having an air passage and installed to closely adhere to at least a portion of the filter frame along the circumference of the support for sealing; and at least one seal insert disposed adjacent to the tube, the seal insert having an outer sealing surface configured to adjustably and closely adhere to a portion of the filter frame. The support may include a bottom plate. The filter frame may have four corners; and the device may include at least four seal inserts, each of the seal inserts having an outer sealing surface configured to adjustably and closely adhere to one of the four corners of the filter frame; and each of the seal inserts may be slidably secured to a slot defined in the bottom plate at a location adjacent one of the corners of the filter frame when the block plate may be inserted through the filter frame. The outer sealing surface of each of the seal inserts may have a shape complementary to the shape of a respective one of the four corners of the inner surface of the filter frame. The upper side of the support may be integrated with the lower circumference side of the block plate. The support may include a upper plate facing the bottom of the block plate, a side wall extended downwardly from the peripheral side of the upper plate, and a protrusion plate extended outwardly from the bottom of the side wall. At least two handles may be optionally provided on a certain position of the bottom of the support. The tube may be made of elastic polymer. The tube may be formed with double-structure by two of them. A sealing member may be installed to block the gap between the edge of the filter frame and its corresponding side of the tube. An optional confirmation window which may be transparent may be formed in the block plate. A confirmation window which may be a transparent body may be formed in the block plate, and the confirmation window may be formed such that an open area having a certain size may be formed both on the block plate and the upper plate, and the peripheral side of the open area adheres closely to the positions of the block plate and the support which it contacts for sealing. The transparent body may be made of anti-electrostatic transparent acryl. A ring may be formed on the lower side of the frame, and a hanging member may be formed on the lower side of the support corresponding to the ring. A bearing means may be formed on the open area of the upper plate in order to support and bear the bottom of the transparent body. A hole having a certain size may be formed on the center of the transparent body, and on its corresponding site of the support, and on the hole may be installed a container-shaped mounting member having a hole on its bottom, and a filter installed thereinside.

In another respect, disclosed is an auxiliary filter exchange device including: an insert frame provided to be temporarily inserted into a filter frame extended downwardly toward the inside of a production line and equipped with a filter thereon, in which the insert frame may have an outer side wall around its periphery facing the inside wall of the filter frame, and penetrating site on its center provided with a protrusion formed on its inside wall in order to equip an auxiliary filter thereon; an inflatable tube having an air passage and installed to closely adhere to the temporary frame along the circumference of the outer side wall of the temporary frame for sealing; an auxiliary filter inserted from the upper side of the inside wall of the temporary frame and supported by the protrusion; and at least one seal insert disposed adjacent to the inflatable tube, the seal insert configured to adjustably and closely adhere to the tube. The device may include at least four seal inserts, each of the seal inserts having an outer sealing surface configured to adjustably and closely adhere to one of the four corners of a filter frame. The outer sealing surface of each of the seal inserts may have a shape complementary to the shape of a respective one of the four corners of the inner surface of the filter frame. At least two handles may be optionally provided on a certain position of the bottom of the temporary frame. A sealing member may be installed to block the gap between the edge of the filter frame and its corresponding side of the tube.

BRIEF DESCRIPTION OF THE DRAWINGS

FIG. 11 is a simplified bottom view of an auxiliary device for filter exchange according to one embodiment of the disclosed device.

FIG. 12 is a simplified partial bottom view of an auxiliary device for filter exchange according to one embodiment of the disclosed device.

DESCRIPTION OF ILLUSTRATIVE EMBODIMENTS

Reference will now be made in detail to the preferred embodiments of the disclosed device, examples of which are illustrated in the accompanying drawings.

Figure 1:
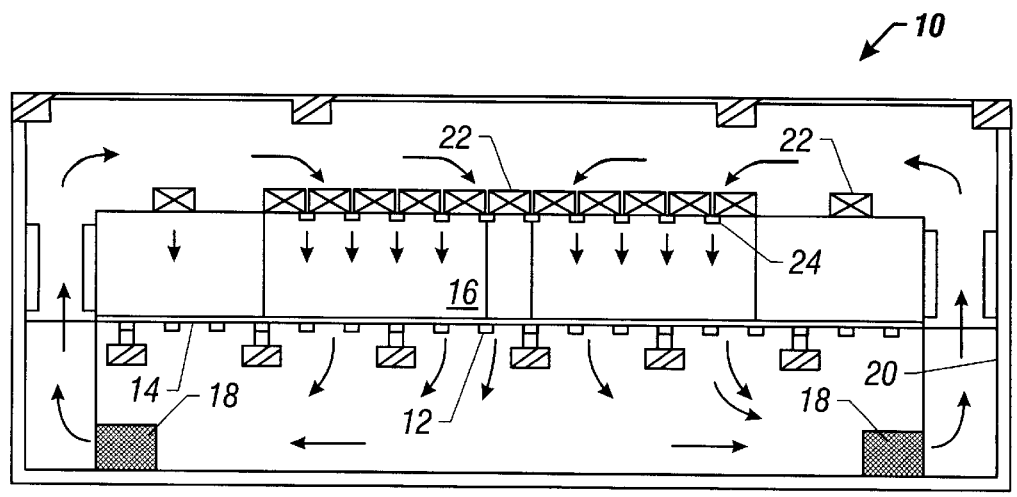
FIG. 1 is a schematic representation showing a conventional clean room for manufacturing semiconductor devices.
Figure 2:
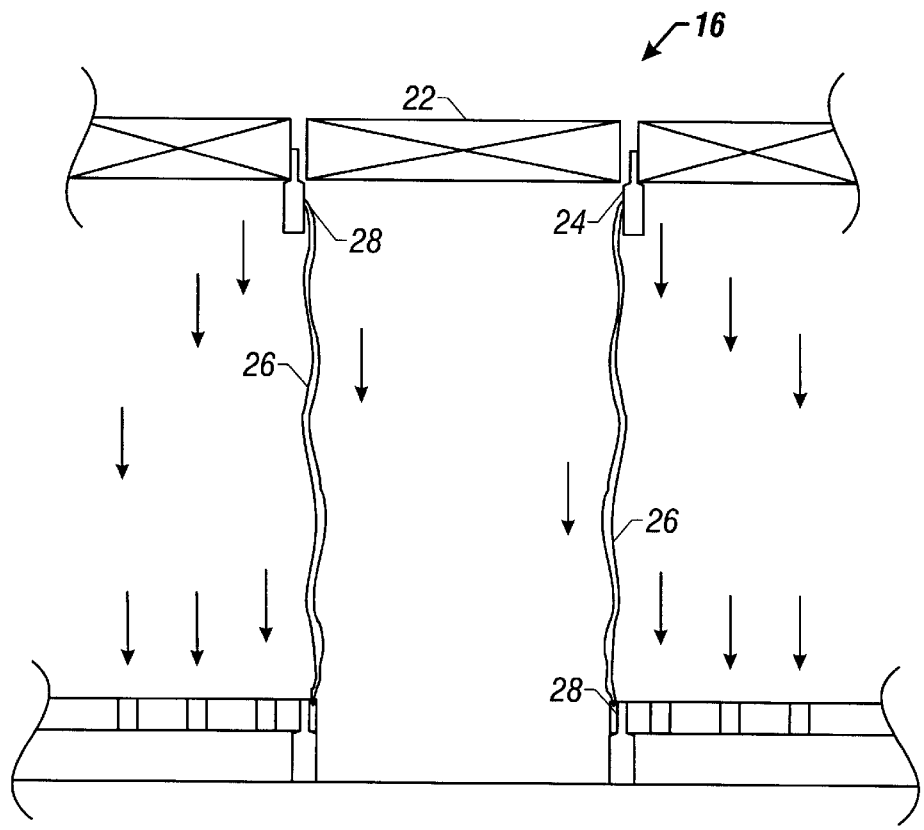
FIG. 2 is a sectional view showing the installation of a conventional auxiliary device for filter exchange inside the filtering system of a clean room.
Figure 3:
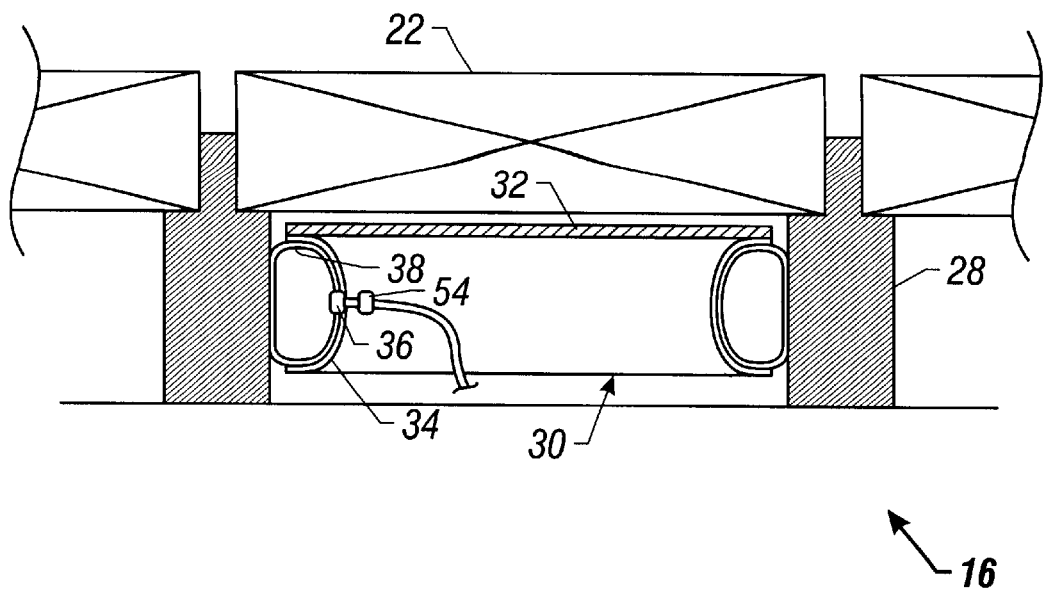
FIG. 3 is a sectional view showing the installation of an auxiliary device for filter exchange inside the filtering system of a clean room according to the disclosed device.
Figure 4:
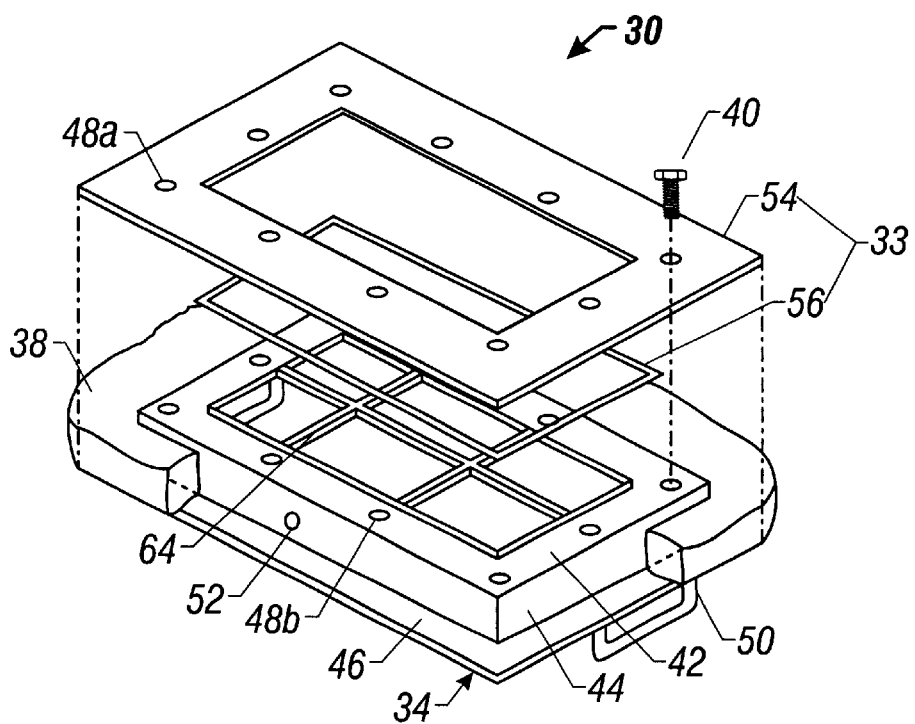
FIG. 4 is a disassembled perspective view showing in detail the auxiliary device for filter exchange of FIG. 3.
Figure 5:
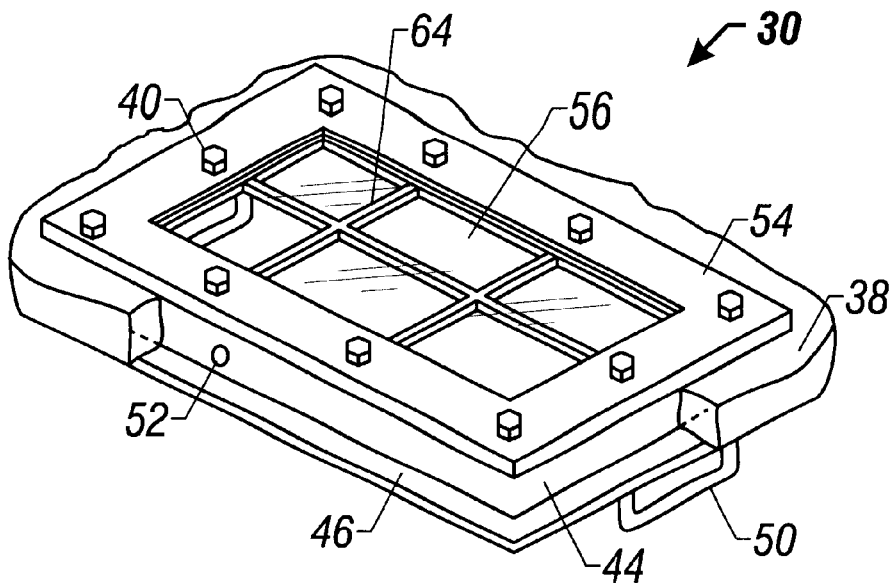
FIG. 5 is a perspective view showing the coupled state of the auxiliary device for filter exchange of FIG. 4.
Figure 6:
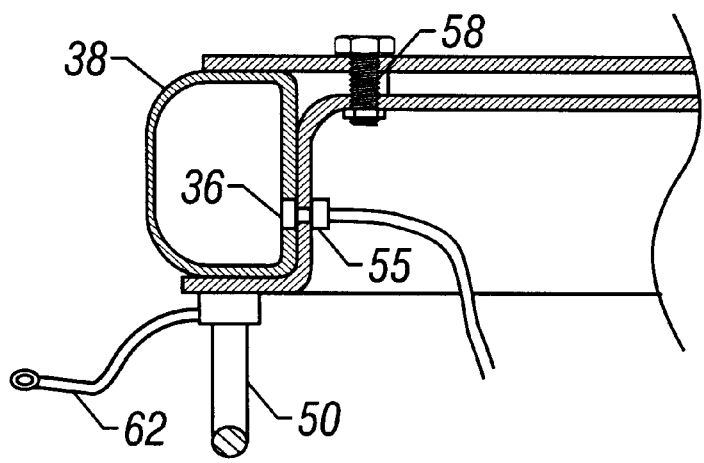
FIG. 6 is an enlarged sectional view showing the installation state of the auxiliary device for filter exchange of FIG. 5.
Figure 7:
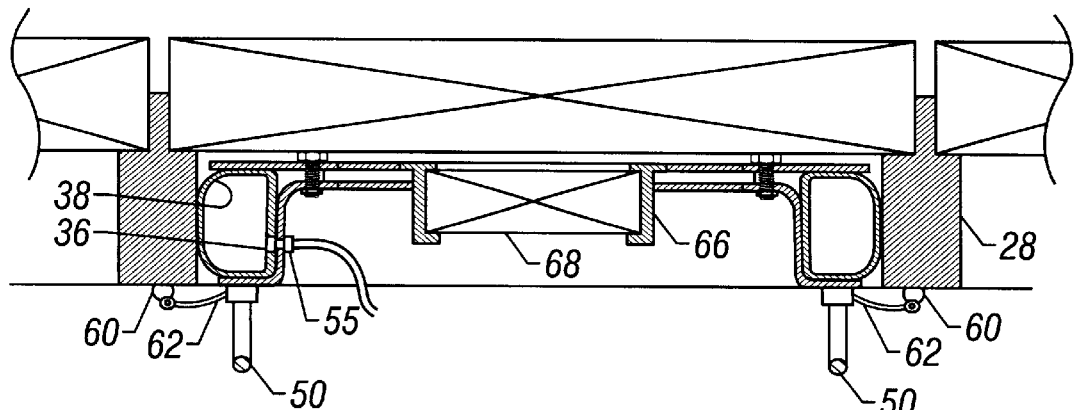
FIG. 7 is a sectional view showing the auxiliary device for filter exchange according to one embodiment of the disclosed device.

FIG. 3 is a sectional view showing the installation of one embodiment of an auxiliary device or jig for filter exchange inside the filtering system of a clean room according to the disclosed device, FIG. 4 is a disassembled perspective view showing in detail the auxiliary device for filter exchange of FIG. 3, FIG. 5 is a perspective view showing the coupled state of the auxiliary device for filter exchange of FIG. 4, and FIG. 6 is an enlarged sectional view showing the installation state of the auxiliary device for filter exchange of FIG. 5.

Referring now to the above figures, a filter 22 for filtering the air introduced into the production line 16 is provided in filter frame 28 installed on the upper side of the production line 16 with a lattice shape, and the air inside a clean room is circulated by a circulation fan.

The lower side of the filter frame 28 is extended downwardly from the filter 22 so as to have an extended part directed toward the inside of the production line 16.

In order to exchange a damaged filter among the filters 22 installed on the filter frame 28 with the air stream maintained, it is necessary to install an auxiliary device for filter exchange 30 corresponding to the lattice-shaped filter frame 28 on which the damaged filter is placed in order to block the air stream passing through the filter frame 28.

As shown in FIG. 3, the auxiliary device 30 for filter exchange includes: a block plate 32 having width to be inserted through the filter frame 28 extended downwardly toward the inside of a production line; a support 34 for supporting the bottom of the block plate 32 and facing with the inside wall of the filter frame 28 keeping a constant distance between them; and a tube 38 having an air passage 36 and installed to closely adhere to the filter frame 28 along the circumference of the support 34 for sealing.

The support 34 may include a plurality of plates with lattice shape, each of them facing with each corresponding inside wall of the filter frame 28 in its every direction, and the position in which the tube 38 is placed has a concave-shape.

In one embodiment, the block plate 32 and the support 34 are combined in such a manner that the upper side of the support 34 is welded to the lower peripheral side of the circumference side of the block plate 32 as shown in FIG. 3, or as shown in FIGS. 4 or 6, they can be combined by using a locking means 40.

As shown in FIGS. 4 or 6, the combination of the block plate 32 and the support 34 by using the locking means 40 is illustrated as follows.

The support 34 includes an upper plate 42 facing the bottom of the block plate 32, a side wall 44 extended downwardly from the peripheral side of the upper plate 42, and a protrusion plate 46 extended outwardly from the bottom of the side wall 44.

In addition, the peripheral side of the upper plate 42 is placed within the peripheral side of the block plate 32, and locking hole 48a, 48b are formed on the peripheral side of the upper plate 42 and its corresponding block plate 32 with both through each other. The block plate 32 and the support 34 are combined by locking them through the locking hole 48a, 48b with the locking means 40.

In addition, on a certain position of the side wall 44 is provided a penetrating passage 52 corresponding to the air inlet 36, which is installed to penetrate from outside of the side wall 44 to its inside through the penetrating passage 52 so as to be selectively connected with air opening 55 through which air is introduced from the inside of the side wall 44 into the tube 38.

A handle 50 is provided on a certain position of the bottom of the support 34 to easily bear and support the auxiliary device of filter exchange 30 by an operator.

The tube 38 uses elastomer, that is, any material made of elastic polymer such as rubber can be employed for the tube 38. A plurality of tubes 38 can be installed with a multiple layer structure in accordance with the filter frame 28 extended toward the production line 16, and preferably two of them are installed.

In addition, the edge of the tube 38 placed on the edge of the support 34 can be shaped corresponding to the shape of the filter frame 28 to closely adhere thereto in order to prevent the gap on the edge of the filter frame 28 during the expansion of the air introduced therein.

Meanwhile, for another way to prevent the gap between the edge of the filter frame 28 and its corresponding side of the tube 38, the edge side of the filter frame 28 can be formed curved-shaped going downward, or a contact member being shaped corresponding to the edge of the filter frame 28 can be installed thereon.

A confirmation window is formed on the block plate 32 for easily monitoring the exchange of the filter 22 for confirmation, and it is formed such that an open area having a certain size is formed on the center of the support plate 54 and the upper plate 42, and the peripheral side of the confirmation window, which is a transparent body 56, in placed on the circumference of the open area.

In addition, a sealing member 58 is installed on the peripheral side of the transparent body 56 so that it sticks to the circumference of the open area during the coupling of the support plate 54 and the upper plate 42 in order to maintain the sealing on the up/down side of the transparent body 56. The transparent body 56 may be made of anti-electrostatic acryl.

Since the auxiliary device of filter exchange 30 adheres and sticks due to the expansion of the tube 38, but it is sometimes pushed out by the pressure of the air on the upper side of the filter frame 28, a ring 60 is preferably formed on the lower side of the filter frame 28, and a hanging member 62 corresponding to the ring 60 is formed on the lower side of the support 34.

In addition, on the inside circumference of the open area formed on the center of the upper plate 42 is installed a bearing means 64 for support the bottom of the transparent body 56 in order to prevent it from becoming distorted by the pressure of the air on the upper side of the filter frame 28 as described above.

Further, the bearing means 64 has an open area which is corresponding to that on the center of the transparent body 56 in order to reduce the pressure of the air on the upper side of the filter 22. On the open area, a mounting member 66 with container-shaped and its bottom penetrating is installed, and an auxiliary filter 68 can be formed inside the mounting member 66 to filter air.

Figure 8:
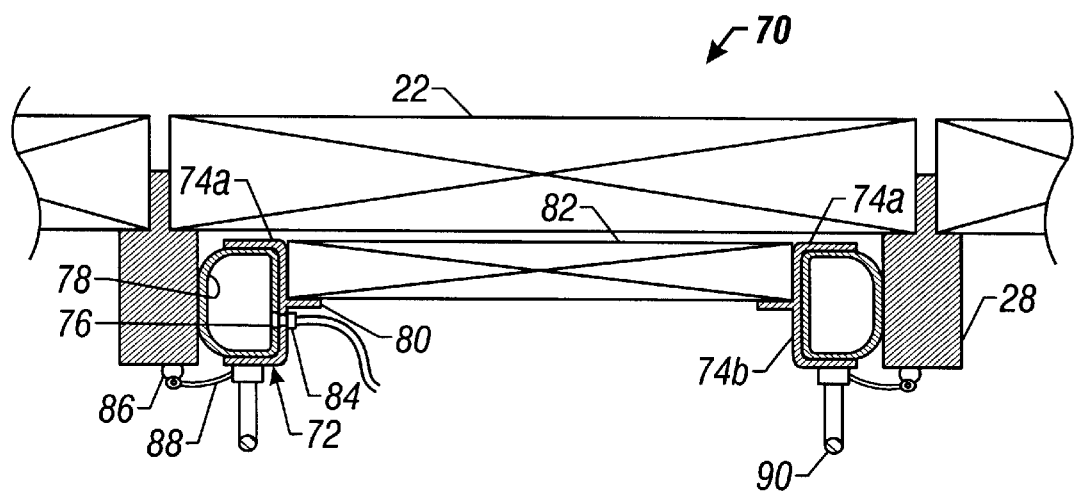
FIG. 8 is a sectional view showing the auxiliary device for filter exchange according to one embodiment of the disclosed device.

FIG. 8 is a sectional view showing the installation of an auxiliary device of filter exchange 70 according to one embodiment of the disclosed device, and its construction and installation are illustrated referring to FIG. 8 in detail.

The auxiliary device for filter exchange in a clean room includes: a temporary frame 72 inserted into a filter 22, wherein a plurality of plates are combined each facing the inside wall of the filter 22; protruded parts 74a, 74b extended outwardly from the upper side and the lower side of the temporary frame 72; an air inlet 76; at least one tube 78 installed along the outer wall between the protruded parts 74a, 74b; a protrusion 80 protruded along the certain position of the inside wall of the temporary frame 72; and an auxiliary filter 82 inserted from the upper side of the inside wall of the temporary frame and supported by the protrusion 80.

The tube 78 is formed such that a plurality of tubes are provided in multiple layers on the side of the temporary frame 72 in accordance with the extended filter frame 28, and generally two of them are composed in double structure.

In addition, on a certain position of the side wall of the temporary frame 72, a penetrating hole (not shown for the simplification of the picture) is formed corresponding to the air inlet 76, and the penetrating hole is provided on the lower side of the protrusion 80 formed on the inside wall of the temporary frame 72 as described above.

The air inlet 76 is inserted from the outer side wall to the inside wall through the penetrating hole and selectively is connected to the air opening 84.

Further, since the edge of the filter frame 28 can have a gap for the expanded tube 78, in order to prevent this, the edge of the tube 78 placed on the side of the temporary frame 72 is shaped to correspond to the edge of the filter frame 28 so as to closely adhere during the air expansion.

Meanwhile, in order to prevent the gap of the edge of the filter frame 28, the edge of the filter frame 28 can be shaped curved, or a contact member is prepared having a shape corresponding to the edge of the filter frame 28.

Meanwhile, since the auxiliary device of filter exchange 70 adheres and sticks due to the expansion of the tube 38, but it is sometimes pushed out by the pressure of the air on the upper side of the filter frame 28, a ring 86 is formed on the lower side of the temporary frame 72.

The installation of the auxiliary device for filter exchange 30, 70 and the filter exchange are illustrated in detail as follows. The auxiliary device 30, 70 are inserted to the inside wall of the filter frame 28 below a damaged filter 22, and the hanging member 62, 88 are fixed on the ring 60, 86 formed on the lower side of the filter frame 28.

The air opening 54, 84 are connected to the air inlet 36, 76 which are protruded from the support 34 or temporary frame 72 so as to introduce the air inwardly. The tube 38, 78 expanded by the introduced air press the inside wall of the filter frame 28 so as to prevent the air flow moving through the filter frame 28 below the damaged filter 22.

Accordingly, the damaged filter 22 is exchanged by the operator in the position over the filter frame 28. When the filter exchange is completed, in the reverse way, the air inside the tube 38, 78 is discharged through the air inlet 36, 76, and the auxiliary device for filter exchange 30, 70 are separated from the filter frame 28 by separating the hanging member 62, 88 fixed on the ring 60, 86.

When the auxiliary device for filter exchange 30, 70 are installed inside of the filter frame 28, a contact member is installed in order to prevent the gap between the edge side of the filter frame 28 and the expanded tube 38, 78.

FILTER CHANGE DEVICE WITH SEAL INSERTS

In other embodiments, the disclosed device may be provided with optional seal inserts to enhance the seal between a filter change device or jig and a clean room filter frame. Following is a description of one exemplary embodiment of such a device incorporating seal inserts. However, it will be understood with the benefit of this disclosure that any of the features disclosed in this exemplary embodiment may be combined with any other embodiments or features of an auxiliary device for filter exchange described elsewhere herein.

Figure 9:
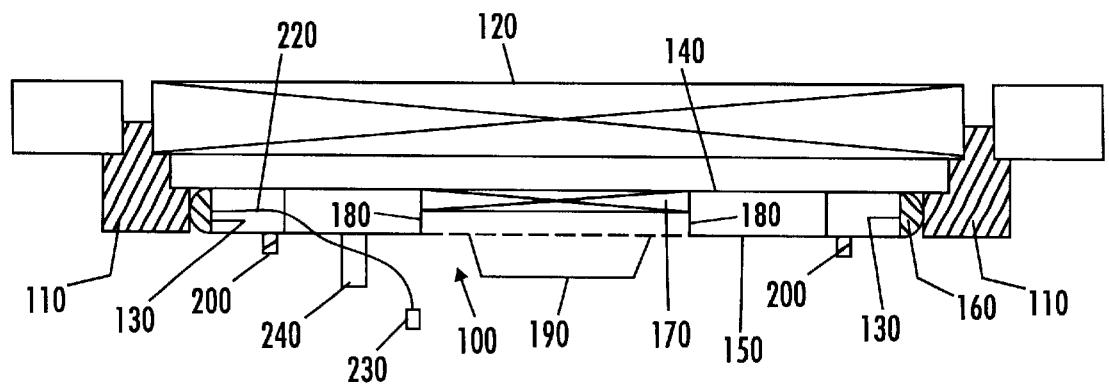
FIG. 9 is a sectional view showing the auxiliary device for filter exchange according to one embodiment of the disclosed device.
Figure 10:
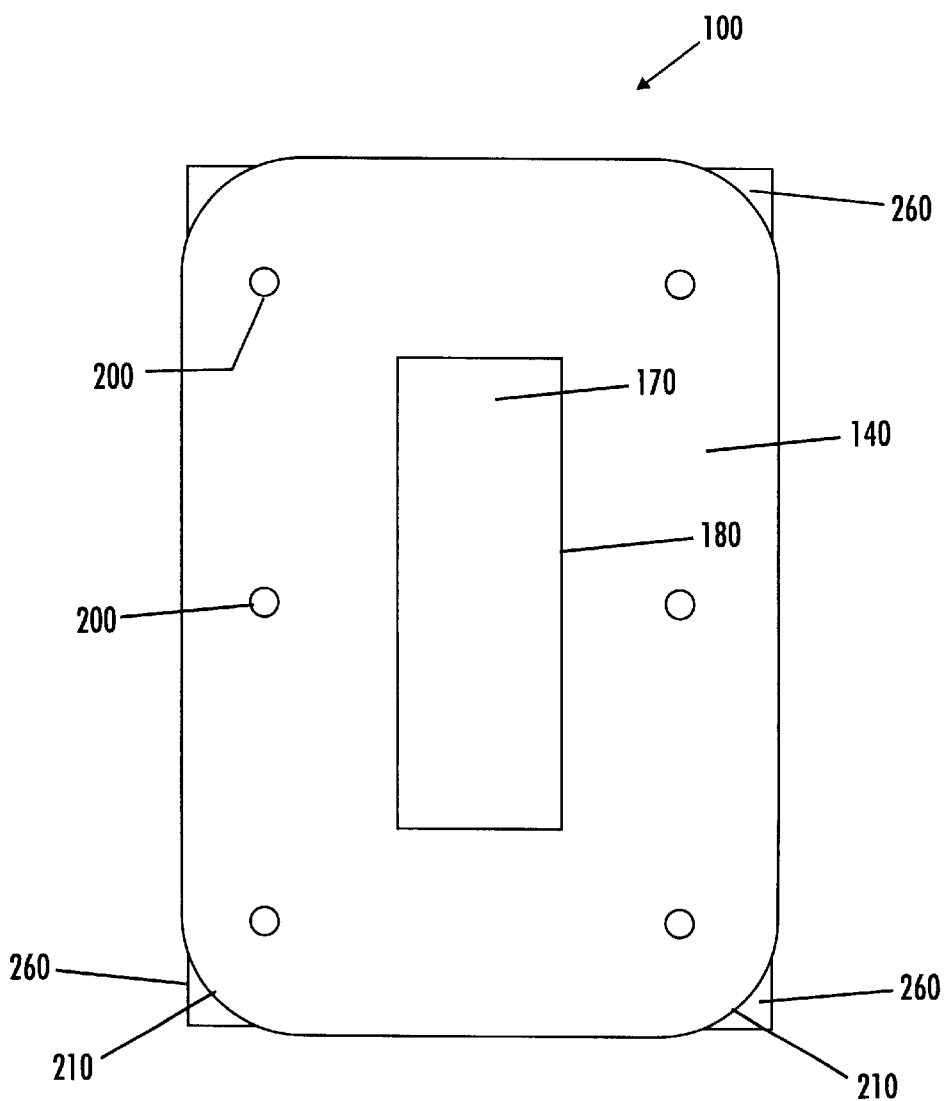
FIG. 10 is a simplified top view of an auxiliary device for filter exchange according to one embodiment of the disclosed device.

An exemplary embodiment of an auxiliary or filter change device 100 may be understood by referring to FIGS. 9–13 and initially to FIGS. 9–11. FIG. 9 is a simplified sectional view of the filter change device 100 shown positioned in a filter frame 110 adjacent to a clean room air filter 120. FIG. 10 is a top view, and FIG. 11 is a bottom view of the filter change device 100. In this embodiment, the filter change device 100 is shaped and dimensioned to be received in a rectangular filter frame 110, for example, a 2'×4' filter frame. The filter change device 100 includes an insert frame 130 sandwiched between a top plate 140 and a bottom plate 150. The insert frame 130 is shown surrounded by an adjustable sealing member 160. An optional window 170 may be provided to allow viewing through the device 100. The window 170 is held in place by vertical walls 180. Optional handles 190 are also shown on the outer surface of bottom plate 150 to assist in positioning the filter change device 100.

The insert frame 130 (in this case constructed of aluminum plate but alternately may be steel, plastic, etc.) is disposed between the top plate 140 and the bottom plate 150 and attached to each by fasteners 200. As best seen in FIG. 12, the upper plate 140 has rounded corners 210 disposed adjacent to each corner of the filter frame 110. Such rounded corners 210 may be desirable, for example to prevent binding during installation between filter frame 110. However, it is also possible that upper plate 140 could have a shape with square corners, such as that employed for bottom plate 150. The outer surface of the top plate 140 is relatively flat and flush having no protruding bolts. In this regard, the fastening devices 200 may be flush surfaced fastening devices such as welded bolts from underneath side of top plate 140. This may be desirable in order to prevent an interference with a filter (either the filter being replaced, or a new filter) by protrusions from the surface of top plate 140 when top plate 140 is in position adjacent a filter. However, it will be understood with benefit of this disclosure that alternate structures are possible, for example a fastening device 200 may have a surface that may be adjustably or slidably connected to a top plate, but have a flush surface such that it does not interfere with the filter, and/or a device 200 may be positioned in use such that top plate 140 is spaced far enough from the filter so that no contact is made.

As best seen in FIGS. 9 and 11, the bottom plate 150 typically may be dimensioned to have a shape complimentary to the inner surface of the filter frame 110. However, the exterior dimensions of bottom plate 150 are typically somewhat smaller than the inner surface of filter frame 110 such that the plate 150 may be easily inserted into the filter frame 110. In one embodiment, a gap of from about 1/8" to about 3/16" exists between the inner surface of filter frame 110 and the exterior outline of bottom plate 150 when the device 100 is inserted in the filter frame 110.

In one embodiment, the top plate 140 and the bottom plate 150 may be, for example, 1/8" thick aluminum plate. However, it will be understood with the benefit of this disclosure, that the top plate 140 and/or the bottom plate 150 may be constructed of alternate materials such as alloy, titanium, steel plate, plastic plate, etc. and combinations thereof, as long as a suitably rigid structure is provided for sealing a filter frame during filter replacement.

The adjustable seal member 160 may be an inflatable tube as described elsewhere herein. For example, in one embodiment, the inflatable tube 160 is a 1¼" diameter neoprene inflatable seal, such as a "PNEUMA-SEAL STANDARD DESIGNS TYPE I" inflatable seal available from Presay of Pawling, New York. However, it will be understood with the benefit of this disclosure that such an inflatable tube may be any other material or design suitable for functioning as an inflatable seal in the methods described herein.

As best seen in FIGS. 9 and 11, an air supply tube 220 is provided, which furnishes air to the inflatable tube 160 through an air opening or fitting 230, where an air source may be removably connected. The air fitting 230 may be, for example, a release valve which functions as a one-way check valve to allow inflation of an inflatable adjustable sealing member 160, and which may be manually actuated to allow deflation. An optional pressure indicator 240 (which may be a pressure gauge or other pressure indicator known in the art, for example a Ashcroft pressure gauge) may be mounted on the bottom plate 150 and connected to the air supply tube 220 to allow measurement of inflation pressure of inflatable tube 160, and to allow monitoring for leaks.

The pressure indicator 240 is shown mounted adjacent to a removable access plate 250 (best seen in FIG. 11) through which the air supply tube 220 extends. If so desired, the removable access plate 250 may be optionally provided for ease of access to make air tube connections with an inflatable tube 160.

Referring now to FIGS. 10, 11 and FIG. 12, which is a magnified bottom view of a portion the device 100, four corner shaped seal inserts 260 are in sealing position against inner surface of the filter frame 110 by virtue of the inflated inflatable tube 160. The outer sealing surfaces of seal inserts 260 are dimensioned to have a right angle shape so as to allow inserts 260 to be sealably received in corner sections of the inner surface of the rectangular filter frame 110. As best seen in FIGS. 11 and 12, fastening devices 270 are provided that protrude through adjustment slots 280 in the bottom plate 150 to allow the corner shaped inserts 260 to adjustably slide as described more fully below. An adjustment slot 280 is provided at each of the corners of the bottom plate 150 and in a position adjacent to a corresponding corner of inner surface of filter frame 110. The bolt or other fastening device 270 is attached to the corner shaped seal insert 260 so that corner insert 260 is a slidably adjustable during inflation of inflatable tube 160 in the direction shown by the arrows shown in FIG. 12. In one embodiment, the fastening devices 270 may be Teflon bolts, although any other device suitable for attaching a seal insert to a bottom plate 150 may be provided including metal bolts, screws, studs, etc. In one embodiment, the adjustments slots are slots of about 1½" in length, about 3/8" in width and receive a ¼" Teflon bolt which is about 1¼" in length.

The corner-shaped seal inserts 260 may be formed of any material (e.g., rigid or non-rigid) which may function to seal areas of a filter frame not contacted in a sealable manner by an inflatable tube member disclosed herein. Examples of suitable materials for the inserts 260 include, but are not limited to, plastic, rubber, neoprene, polyurethane, polypropylene, metal, etc. In one embodiment best seen in FIG. 12, the corner shaped seal inserts 260 are formed of 1¼" thick polypropylene having two straight sides disposed at right angles with each having a length of about 3", with the third arcuate shaped side having a radius of about 4½". These straight sides are shown configured to form an angle of about 90° so as to be dimensioned complementary to a corner section of the filter frame 110. The third and remaining side of the corner seal insert 260 may have an arcuate surface 290 for sealably mating with, for example, the rounded corners of the inflatable tube member 160.

The corner-shaped seal inserts 260 may be adhered to the inflatable tube 160 using an adhesive such as "ARMSTRONG 520". However, it will be understood with benefit of this disclosure that other adhesives or adhering materials may be employed, and that in some embodiments, no adhesive material is necessary. For example, a corner seal insert 260 may be held in slidable and operative relationship with adjustable sealing member 160 by virtue of a fastening device 270 and the corresponding adjustment slot 280 as shown in FIG. 12, in which case it is only necessary that a seal be formed between the arcuate side 290 of corner-shaped insert seal 260 and the curved outline of the inflatable tube 160 when it is in inflated condition.

An optional gasket or sealing member 300 may be provided (e.g., secured by adhesive, etc.) on the straight edges of the seal insert 260 in order to contact and form a seal with inside surface of the filter frame 110. The sealing material or gasket 300 may be any material suitable for augmenting or facilitating a seal between corner-shaped seal insert 260 and the inside surface of filter frame 110, including similar materials as employed for the inflatable tube 160. Examples of such suitable material include, but are not limited to gasket materials known in the art such as neoprene, foam, rubber, etc.

Figure 13:
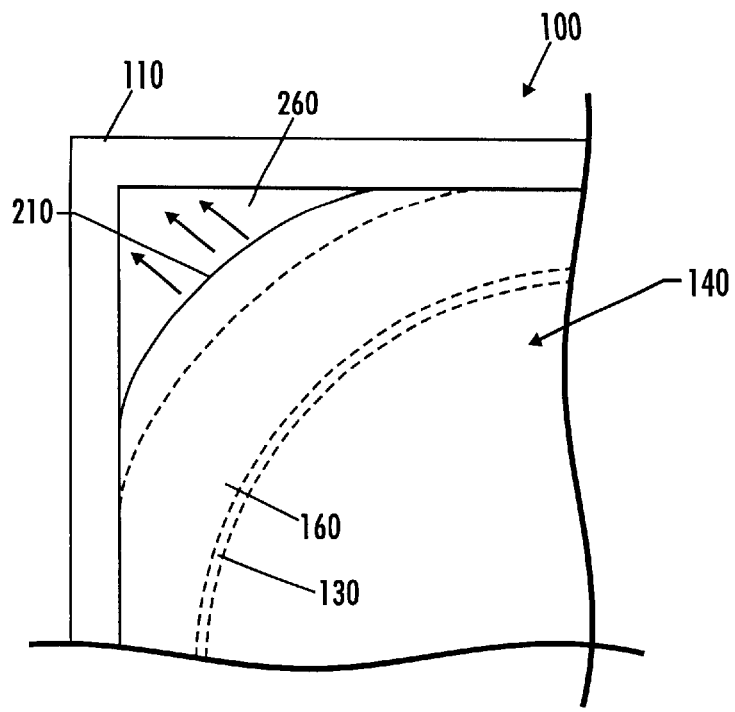
FIG. 13 is a simplified partial top view of an auxiliary device for filter exchange according to one embodiment of the disclosed device.
Figure 14:
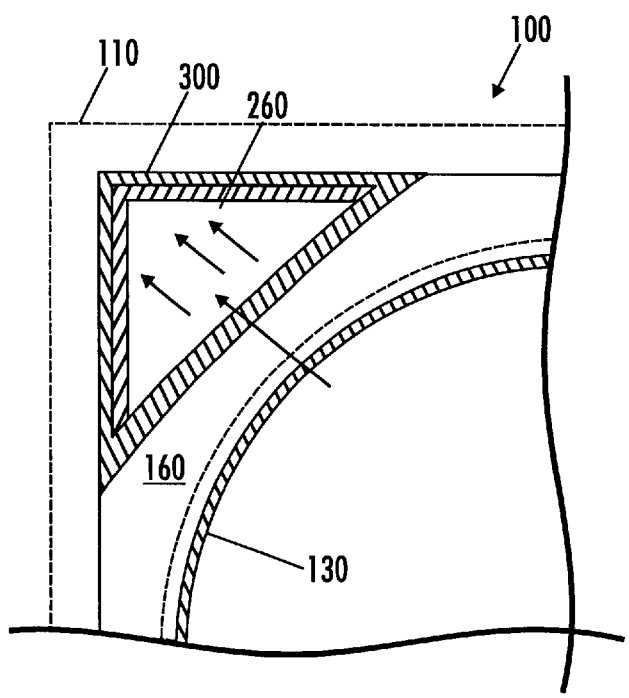
FIG. 14 is a simplified partial cutaway top view of an auxiliary device for filter exchange according to one embodiment of the disclosed device.

The operation of the device will now be described in conjunction with FIGS. 12, 13 and 14. FIG. 13 is a partial top view of the filter change device 100 inserted within the filter frame 110, and FIG. 14 is a partial top view like FIG. 13, but with the top plate 140 shown in FIG. 13 removed to reveal the seal insert 260. Also shown in FIG. 12 is corner-shaped insert piece 260 moving in a direction toward a corresponding corner in filter frame 120 in a manner as previously described. Hidden from view, but shown by dashed lines in FIG. 13, are the inflatable tube 160 and the insert frame 130. As shown by the motion arrows, inflation of the inflatable tube 160 causes expansion of the tube 160 outward and against the interior surfaces of the filter frame 110. This motion in turn causes the corner-shaped seal inserts 260 to move outward and toward corresponding corners of the filter frame 110.

Exemplary dimensions of filter exchange devices are listed in Table 1 below:

TABLE 1

| Filter Size | Extended Filter Frame Dimensions | Physical Size of the Filter | Overall Jig Dimension | Jig Window Dimensions |
|---|---|---|---|---|
| 2' × 4' | 21¾" × 45¾" × 1½" | 22.8" × 46.8" | 21⅝" × 45⅝" × 1½" | 8" × 12" × ⅛" |
| 2' × 2' | 21¾" × 21¾" × 1½" | 22.8" × 22.8" | 21⅝" × 21⅝" × 1½" | 8" × 12" × ⅛" |

Although exemplary embodiments of a filter change device 100 having corner shaped seal inserts 112 have been illustrated and described herein, it will be understood with benefit of this disclosure that other features and combinations of features may be employed. For example, it will be understood that a shape of a filter change device may be fabricated to correspond to any shape filter frame which may be encountered to make it suitable for placement therein.

Furthermore, corner insert seals or seal inserts may have any shape suitable for providing additional sealing effect to selected areas of a filter frame. Furthermore, it would be understood that features such as handles, pressure gauges, windows and auxiliary filters may be optionally employed in any combination, or alternatively be absent altogether. Furthermore it will be understood that seal inserts may be employed with any of the embodiments of auxiliary devices for filter exchange as described elsewhere herein.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents and alternatives falling within the spirit and scope of the invention as defined by the appended claims. Moreover, the different aspect of the disclosed methods and apparatus may be utilized in various combinations and/or independently. Thus, the invention is not limited to only those combinations shown herein, but rather may include other combinations.

What is claimed is:

1. A filter exchange device for use in an air filtering system of a clean room having a filter frame extended downwardly toward an inside of a production line, the filter exchange device comprising:

an insert frame;

an adjustable sealing member surrounding the insert frame and having an outer surface adapted to be sealably received by at least a portion of an inner surface of the filter frame; and at least one seal insert sealably disposed adjacent to an outer surface of the adjustable sealing member, the seal insert configured to be sealably received by a portion of the inner surface of the filter frame.

2. The device of claim 1, wherein the inner surface of the filter frame comprises four corners and wherein the filter change device comprises four seal inserts, each of the seal inserts comprising an outer sealing surface configured to be sealably received by one of the corners of the inner surface of the filter frame such that an upstream side of the insert frame is pneumatically sealed from a downstream side of the insert frame when the outer sealing surface of the insert frame is sealably received by at least a portion of the inner surface of the filter frame.

3. The device of claim 2, wherein the outer sealing surface of each of the seal inserts comprises a shape complementary to the shape of a respective one of the corners of the inner surface of the filter frame.

4. The device of claim 3, wherein the outer sealing surface of each of the seal inserts is adjustable between a sealing position in sealing contact with one of the corners of the inner surface of the filter frame and an insertion position in non-sealing contact with one of the corners of the inner surface of the filter frame.

5. The device of claim 4, further comprising a pressure indicator.

6. The device of claim 5, further comprising an air supply tube and an air fitting coupled to the pressure indicator.

7. The device of claim 6, further comprising a removable access plate, through which the air supply tube extends.

8. The device of claim 5, wherein the pressure indicator is disposed on the downstream side of the insert frame.

9. The device of claim 5, wherein the upstream side of the insert frame comprises dimensions complementary to the inner surface of the filter frame to allow insertion of the insert frame into the downwardly extending filter frame and wherein the device further comprises at least two handles adjacent the downstream side of the insert frame to assist in insertion of the upstream side of the insert frame into the filter frame.

10. An auxiliary device for filter exchange in a clean room comprising:

a block plate having a width to be inserted through a filter frame extended downwardly toward an inside of a production line and equipped with a filter thereon;

a support for supporting a bottom of the block plate and facing with an inside wall of the filter frame to keep a substantially constant distance between the block plate and the filter frame;

a tube comprising an air passage, the tube being configured to closely adhere to at least a portion of the filter frame along a circumference of the support for sealing; and at least one seal insert disposed adjacent to the tube, the seal insert having an outer sealing surface configured to adjustably and closely adhere to at least a portion of the filter frame.

11. The auxiliary device of claim 10, wherein the support comprises an upper plate facing the bottom of the block plate, a side wall extended downwardly from a peripheral side of the upper plate, and a protrusion plate extended outwardly from the bottom of the side wall.

12. The auxiliary device of claim 11, further comprising a transparent confirmation window in the block plate, the confirmation window being configured such that an open area is formed both on the block plate and the upper plate, and a peripheral side of the open area adheres closely to positions of the block plate and the support which it contacts for sealing.

13. The auxiliary device of claim 12, wherein the transparent window comprises an anti-electrostatic transparent acryl.

14. The auxiliary device of claim 12, further comprising bearing means on the open area of the upper plate configured to support and bear the bottom of the transparent window.

15. The auxiliary device of claim 10, further comprising a ring on a lower side of the filter frame and a hanging member on a lower side of the support corresponding to the ring.

16. The auxiliary device of claim 10, further comprising two handles adjacent a bottom of the support.

17. The auxiliary device of claim 10, wherein the tube comprises an elastic polymer.

18. The auxiliary device of claim 10, further comprising a sealing member configured to block a gap between an edge of the filter frame and its corresponding side of the tube.

19. The auxiliary device of claim 10, further comprising a transparent confirmation window in the block plate.

20. The auxiliary device of claim 10, wherein the support comprises a bottom plate.

21. The auxiliary device of claim 20, wherein an upper side of the support is integrated with a lower circumference side of the block plate.

22. The auxiliary device of claim 20, wherein:
the filter frame comprises four corners;
the device comprises four seal inserts, each of the seal inserts having an outer sealing surface configured to adjustably and closely adhere to one of the corners of the filter frame; and
each of the seal inserts is slidably secured to a slot defined in the bottom plate at a location adjacent one of the corners of the filter frame when the block plate is inserted through the filter frame.

23. The auxiliary device of claim 22, wherein the outer sealing surface of each of the seal inserts has a shape complementary to the shape of a respective one of the corners of the inner surface of the filter frame.

24. The auxiliary device of claim 10, further comprising a pressure indicator.

25. The auxiliary device of claim 24, further comprising an air supply tube and an air fitting coupled to the pressure indicator.

26. The auxiliary device of claim 25, further comprising a removable access plate, through which the air supply tube extends.

27. An auxiliary device for filter exchange in a clean room, the auxiliary device comprising:
a temporary frame configured to be temporarily inserted into a filter frame extended downwardly toward an inside of a production line and equipped with a filter thereon, the temporary frame having an outer side wall around its periphery facing an inside wall of the filter frame and a penetrating site on its center configured with a protrusion formed on its inside wall in order to equip an auxiliary filter thereon;
an inflatable tube having an air passage and configured to closely adhere to the temporary frame along the circumference of the outer side wall of the temporary frame for sealing;
an auxiliary filter inserted from the upper side of the inside wall of the temporary frame and supported by the protrusion; and
at least one seal insert disposed adjacent to the inflatable tube, the seal insert configured to adjustably and closely adhere to the tube.

28. The auxiliary device of claim 27, wherein the filter frame comprises four corners and wherein the device further comprises four seal inserts, each of the seal inserts having an outer sealing surface configured to adjustably and closely adhere to one of the corners of the filter frame.

29. The auxiliary device of claim 28, wherein the outer sealing surface of each of the seal inserts comprises a shape complementary to a shape of a respective one of the corners of the inner surface of the filter frame.

30. The auxiliary device of claim 27, further comprising two handles adjacent a bottom of the temporary frame.

31. The auxiliary device of claim 27, further comprising a sealing member configured to block a gap between an edge of the filter frame and its corresponding side of the tube.

32. The auxiliary device of claim 27, further comprising a pressure indicator.

33. The auxiliary device of claim 32, further comprising an air supply tube and an air fitting coupled to the pressure indicator.

34. The auxiliary device of claim 33, further comprising a removable access plate, through which the air supply tube extends.

35. An auxiliary device for filter exchange in a clean room comprising:
a block plate having a width to be inserted through a filter frame having four corners and extending downwardly toward an inside of a production line and equipped with a filter thereon;
a support for supporting a bottom of the block plate and facing with an inside wall of the filter frame to keep a substantially constant distance between the block plate and the filter frame, the support having a bottom plate;
a tube comprising an air passage, the tube being configured to closely adhere to at least a portion of the filter frame along a circumference of the support for sealing; and four seal inserts disposed adjacent to the tube, each of the seal inserts having an outer sealing surface configured to adjustably and closely adhere to one of the corners of the filter frame, each of the seal inserts being slidably secured to a slot defined in the bottom plate at a location adjacent one of the corners of the filter frame when the block plate is inserted through the filter frame.

36. The auxiliary device of claim 35, wherein the support comprises an upper plate facing the bottom of the block plate, a side wall extended downwardly from a peripheral side of the upper plate, and a protrusion plate extended outwardly from the bottom of the side wall.

37. The auxiliary device of claim 36, further comprising a transparent confirmation window in the block plate, the confirmation window being configured such that an open area is formed both on the block plate and the upper plate, and a peripheral side of the open area adheres closely to positions of the block plate and the support which it contacts for sealing.

38. The auxiliary device of claim 35, further comprising two handles adjacent a bottom of the support.

39. The auxiliary device of claim 35, wherein the tube comprises an elastic polymer.

40. The auxiliary device of claim 35, further comprising a sealing member configured to block a gap between an edge of the filter frame and its corresponding side of the tube.

41. The auxiliary device of claim 35, wherein the outer sealing surface of each of the seal inserts has a shape complementary to the shape of a respective one of the corners of the inner surface of the filter frame.

42. The auxiliary device of claim 35, further comprising a pressure indicator.

43. The auxiliary device of claim 42, further comprising an air supply tube and an air fitting coupled to the pressure indicator.

* * * * *